W. N. BATES.
Grain-Drill.

No. 46,626.  Patented Mar. 7, 1865.

UNITED STATES PATENT OFFICE.

WM. N. BATES, OF CENTRE POINT, IOWA.

IMPROVED SEEDING-MACHINE.

Specification forming part of Letters Patent No. 46,626, dated March 7, 1865.

*To all whom it may concern:*

Be it known that I, WILLIAM N. BATES, of Centre Point, in the county of Linn and State of Iowa, have invented a new and Improved Seeding-Machine; and I do hereby declare that the following is a full, clear, and exact description of the same, reference being had to the accompanying drawings, making a part of this specification, in which—

Figure 1:
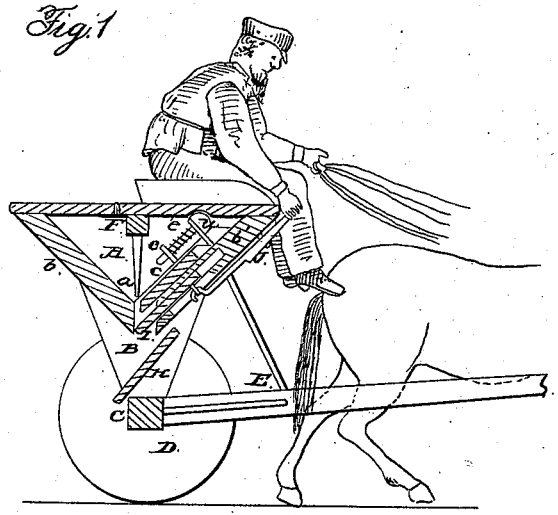
Figure 2:
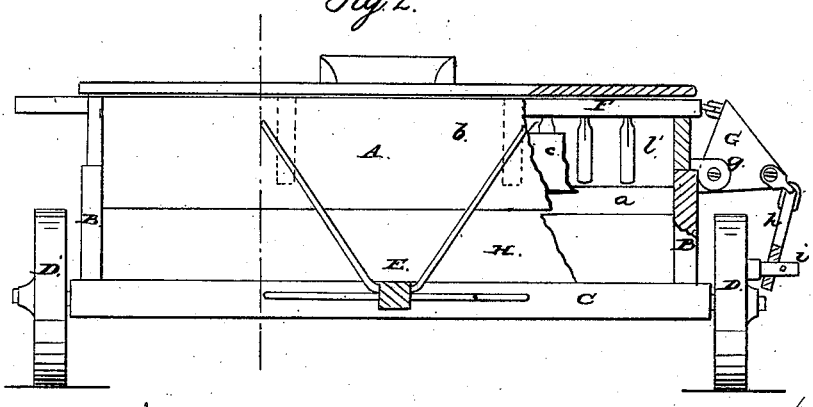

Figure 1 represents a transverse vertical section of my invention. Fig. 2 is a sectional front elevation of the same.

Similar letters of reference indicate corresponding parts in the several figures.

This invention relates to certain improvements in that class of seeding-machines which sow the seed broadcast, the seed being placed in a suitable box and made to discharge through an opening or crevice, the size of which can be regulated by a suitable slide, or which can be closed by a gate, the discharge of the seed being facilitated by an agitator, to which a reciprocating motion is imparted from the driving-gear of the machine.

To enable those skilled in the art to fully understand and construct my invention, I will proceed to describe it.

A represents the seed-box of my machine, which is supported by standards B, rising from the axle C, and this axle has its bearings in two wheels, D D', and it is furnished with a draft-pole, E, so that the whole machine can be readily drawn over a field. The seed-box is made in the form of a miter, and a crevice, a, is left at the corner formed by its two side boards, b b', through which the seed discharges. The size of this crevice can be regulated by a slide, c, which is attached by means of two or more adjusting-screws, d, to the interior of the side board, b', of the box A. Each of the screws d passes through two lugs, e e', one of which is secured to the stationary board b' and the other to the movable slide c, and spiral springs placed round the screws between the lugs e e' have a tendency to push the slide down. By turning these screws in one direction the crevice a is enlarged and by turning them in the opposite direction said crevice is diminished. The lower edge of the regulating-slide c is mitered to correspond to the opposite edge of the crevice a, as clearly shown in Fig. 1 of the drawings, and the seed in the box will readily find its way down to the crevice and out through the same.

The discharge of the seed is facilitated by an agitator, F, which consists of a series of teeth or blades attached to a bar which passes in a longitudinal direction through the upper part of the box A, so that the points of the teeth extend down to the crevice a. A reciprocating motion is imparted to the agitator by means of an elbow-lever, G, which has its fulcrum on a pivot, g, in a bracket attached to the end of the seed-box, and one arm of which connects with the agitator and its other arm with the upper end of a pitman, h, the lower end of which is attached to an eccentric wrist-pin, i, projecting from the outside surface of the driving-wheel D. On drawing the machine over the field the elbow-lever G receives an oscillating motion by the action of the wheel D and pitman h, and a reciprocating motion is imparted to the agitator F. The points of the teeth, sweeping close over the crevice a, prevent the seed from clogging, and a uniform distribution of the seed is effected. On being discharged from the crevice a the seed drops on the scattering-board H and thence on the ground.

I is a gate, which is situated between the side board, b', of the seed-box and the regulating-slide c. This gate connects with a bar, J, which extends upward on the outside of the seed-box, so that it can conveniently be reached by the driver from his seat. In turning on the field or in driving from one field to the other the gate I is pushed down, and thereby the crevice a is closed and the discharge of seed is stopped. By this arrangement the driver is enabled to stop the discharge of seed instantaneously, and a waste of seed is prevented.

This machine is made entirely out of wood, with a few wrought-iron parts, so that it can be made by any carpenter and blacksmith, and so that it can be repaired without the necessity of going to a foundry.

What I claim as new, and desire to secure by Letters Patent, is—

The combination and arrangement of parts herein described, consisting of a mitered seed-box with a regulating-slide, c, with its spring inside of the seed-box, a gate, I, operated by a handle from the exterior, and a toothed reciprocating agitator, F, moving in bearings at the upper part of the seed-box, with its teeth extending down nearly to the seed aperture, and operated by connection with a vibrating block and a link from a wrist on the driving-wheel.

WM. N. BATES.

Witnesses:
L. H. OLLENBECK,
JAMES THOMPSON.